United States Patent [19]
McGee

[11] 3,875,440
[45] Apr. 1, 1975

[54] CASCADE IMAGE INTENSIFIER TUBE WITH INDEPENDENTLY SEALED SECTIONS

[75] Inventor: James Dwyer McGee, London, England

[73] Assignee: Electron Physics Limited, Surrey, England

[22] Filed: Nov. 22, 1972

[21] Appl. No.: 308,723

[30] Foreign Application Priority Data
Nov. 24, 1971 United Kingdom ............ 054553/71

[52] U.S. Cl. .................................. 313/96, 313/102
[51] Int. Cl. .................... H01j 39/18, H01j 39/14
[58] Field of Search .......... 313/102, 96, 94, 97, 98, 313/161

[56] References Cited
UNITED STATES PATENTS

| | | |
|---|---|---|
| 2,258,294 | 10/1941 | Lubszynski et al. ............ 313/101 X |
| 2,270,373 | 1/1942 | Kallmann et al. ................ 313/101 X |
| 2,739,258 | 3/1956 | Sheldon .......................... 313/101 X |
| 2,842,673 | 7/1958 | Sanner ............................. 313/94 X |
| 2,851,625 | 9/1958 | Ruedy et al. ..................... 313/102 X |
| 3,031,580 | 4/1962 | Kocot et al. ..................... 313/94 X |
| 3,043,974 | 7/1962 | McGee ............................. 313/94 X |
| 3,470,380 | 9/1969 | McGee ............................. 313/102 X |
| 3,497,699 | 2/1970 | Pietri et al. ...................... 313/96 X |

*Primary Examiner*—Robert Segal
*Attorney, Agent, or Firm*—Marn & Jangarathis

[57] ABSTRACT

A cascade image intensifier is provided with a mica sheet extending across the interior of the tube and sealed to it to separate electrically each stage. A phosphor screen of one stage is formed on one side of the mica sheet and a photocathode of the next stage is formed on the other side. The photocathode may be at a much lower potential than the phosphor screen on the other side of the sheet. This allows electrons to be accelerated in cascade without the use of very high voltages.

4 Claims, 4 Drawing Figures

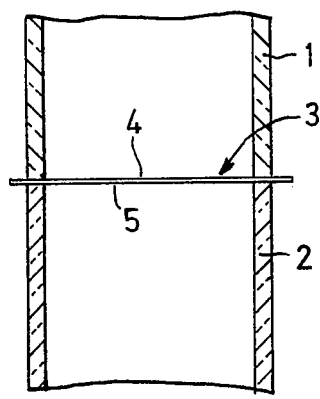
FIG. 1.
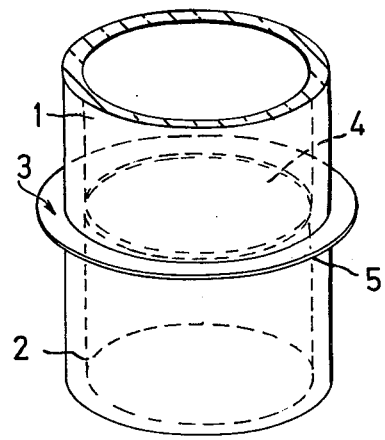
FIG. 2.
FIG. 3.
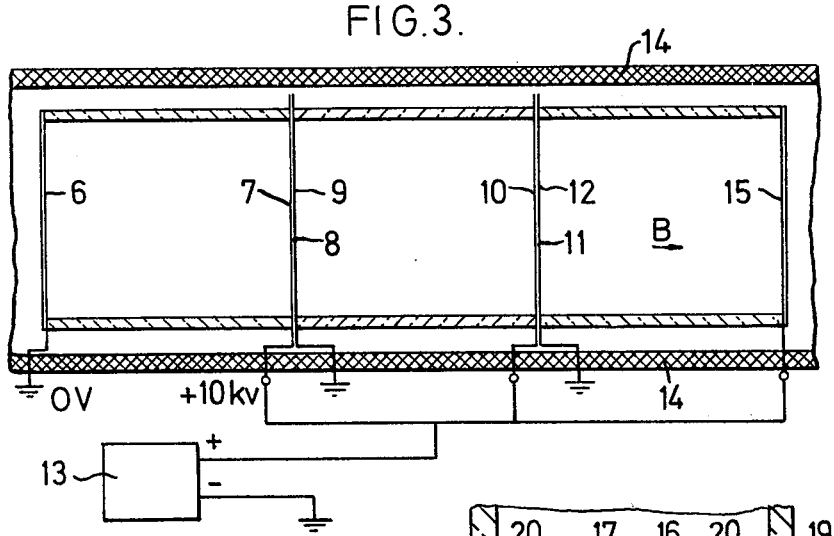
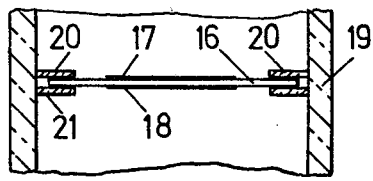
FIG. 4

CASCADE IMAGE INTENSIFIER TUBE WITH INDEPENDENTLY SEALED SECTIONS

This invention relates to a photoelectronic image intensifier tube.

An image intensifier tube has been proposed which comprises several similar sections each having a plane photocathode spaced a few inches from a plane parallel phosphor screen deposited on a transparent membrane mounted inside a continuous vacuum tube. A transparent photocathode is deposited on the other side of this membrane and begins the next stage of the intensifier. The photoelectrons from the photocathode are accelerated by a potential difference of about 10 kV and focused on to the phosphor screen by a uniform axial magnetic field.

The fluorescent light produced by this electron image passes through the thin membrane and liberates an increased number of electrons from the second stage photocathode. These are in turn accelerated and focused on to the next intensifying screen. In a typical intensifier this is done three times.

Although a potential difference of 10 to 15 kV is applied between the photocathode and screen of each stage, it is not practicable with the previously proposed tube to use the same potentials relative to earth on the photocathodes and phosphor screens since it would result in a potential difference of the same amount (10 to 15 kV) across the membrane between any two stages. This may produce electrical breakdown between the phosphor screen of one stage and the photocathode of the next stage. It is therefore necessary to apply increasing potentials to successive stages. This results in an overall potential of 35 to 45 kV on a three-stage tube. This is inconvenient, difficult to control, expensive, heavy and can be hazardous.

According to the present invention there is provided an image intensifier tube comprising a first photocathode formed on an input window; a first phosphor screen formed on an output window; and at least one intermediate stage formed by a transparent insulating sheet extending across the interior of the tube and forming a barrier electrically isolating parts of the tube on either side of the sheet, and a seocnd phosphor screen formed on a first side of the sheet and a second photocathode formed on a second side of the sheet.

The invention will now be described in more detail, by way of example only with reference to the accompanying drawings, in which:

FIG. 1 is a longitudinal section through a part of a photoelectronic cascade image intensifier tube;

FIG. 2 is a perspective view of the part of the tube shown in FIG. 1;

FIG. 3 is a diagrammatic drawing of the image intensifier showing the wiring arrangement; and FIG. 4 is a longitudinal section through a part of a second form of cascade image intensifier tube.

The part of the tube shown in FIGS. 1 and 2 comprises two soda-lime glass cylinders 1 and 2 placed end-to-end. A sheet of high quality mica 3 is sealed between the two adjacent cylinders 1, 2 and arranged to extend a suitable distance such as 10 m.m beyond the external walls of the cylinders. Owing to the use of soda-lime glass, which has a coefficient of expansion close to that of mica, these cylinders can be sealed to the mica by means of a low melting point solder glass to provide an air-tight connection. The mica sheet 3 will stand a voltage of about 10 kV across its thickness.

A phosphor screen 4 is deposited on one side of the mica sheet 3 and a photocathode 5 is deposited on the other side.

To form a cascade image intensifier, a series of such parts are placed end-to-end, sealed and evacuated as shown in FIG. 3. This shows two mica sheets 8 and 11 although more may be provided with input and output windows 6 and 15.

In operation, electrons are emitted from a primary photocathode 6 on the inner surface of a glass end window, held at earth potential and accelerated towards a phosphor screen 7 deposited on a mica sheet 8 and held at $\approx +10$ kV with respect ot the photocathode 6. The electrons are focused on the screen 7 with the aid of an axial magnetic field B produced by a coil or permanent magnet array 14. Light is emitted at points where electrons impinge on the screen 7 and causes photoemission from a second photocathode 9 held at earth potential on the other side of the mica sheet 8. The electrons thus emitted are accelerated towards a second phosphor screen 10 held at + 10 kV and cause light emission at points where electrons strike the screen 10. These electrons in the second stage are also accelerated through 10 kV but owing to the 10 kV potential difference across the mica sheet 8, it is not necessary to raise the potential of the next screen in the tube beyond 10 kV. As many stages may be provided as is desired. In FIG. 3 a third photocathode 12 is shown deposited on a mica screen 11. A final phosphor screen 15 is provided on a glass window at the end of the tube.

The phosphor screen 7, 10, 15 are shown connected to a common 10 kV power supply 13, while the photocathodes 6, 9 and 12 are connected to earth. Alternatively the photocathodes may be held at −10 kV and the phosphor screens at earth potential, if required.

In the arrangement shown in FIG. 4, a borosilicate glass cylinder 19 forms part of an image intensifier tube. A mica sheet 16 is sandwiched between two borosilicate glass washers 20, 21 so as to form a barrier electrically isolating parts of the tube on either side of the sheet. The washers 20, 21 are sealed to the internal wall of the cylinder 19.

A phosphor screen 17 and a photocathode 18 are formed on a limited area of respective opposite sides of the mica sheet 16.

This arrangement forms part of an image intensifier similar to that shown in FIG. 3. It is however no longer necessary for the mica sheet to extend beyond the external walls of the tube. Connections to the phosphor screen and the photocathode may be taken through the glass cylinder 19.

The described tubes provide a cheaper and safer image intensifier tube since a voltage supply producing 40 or 50 kV as is necessary with conventional tubes is no longer required.

I claim:

1. An image intensifier tube comprising an evacuated enclosure; an input window and an output window forming parts of said enclosure, said evacuated enclosure having impervious walls extending between said input and output windows; a first photocathode formed on the input window; a first phosphor screen formed on the output window; and at least one intermediate stage formed by a transparent insulating sheet extending across the interior of the tube and forming a gas-tight seal with the walls of the tube, said sheet extending completely across the interior of the tube and projecting beyond its external walls to provide a barrier electrically isolating parts of the tube on either side of the sheet from substantial potential differentials, a second phosphor screen formed on a first side of said sheet and a second photocathode formed on a second side of said sheet.

2. The image intensifier tube of claim 1, in which the insulating sheet is mica.

3. The image intensifier tube of claim 1, in which the tube is of soda-lime glass and a low-melting point solder glass is provided to seal the mica to the tube.

4. An image intensifier tube comprising an evacuated enclosure; an input window and an output window forming parts of said enclosure, said evacuated enclosure having impervious walls exending between said input and output windows; a first photocathode formed on the input window; a first phosphor screen formed on the output window; and at least one intermediate stage formed by a transparent insulating sheet extending across the interior of the tube and a pair of washers, said pair of washers being sealed to the internal walls of said tube and sandwiching the periphery of said insulating sheet therebetween to form gas-tight seal with the walls of the tube, said insulating sheet providing a barrier electrically isolating parts of the tube on either side of the sheet from substantial potential differentials, a second phosphor screen formed on a first side of said sheet and a second photocathode formed on a second side of said sheet, said tube and said washers being of borosilicate glass.

* * * * *